United States Patent [19]

Cordier

[11] Patent Number: 5,659,302

[45] Date of Patent: Aug. 19, 1997

[54] PROCESS FOR MONITORING EQUIPMENT AND DEVICE FOR IMPLEMENTING SAID PROCESS

[76] Inventor: Renaud Ernest Cordier, 2, rue du Colonel Renard, 92190, Hauts de Seine, Meudon, France

[21] Appl. No.: 653,088

[22] Filed: May 24, 1996

Related U.S. Application Data

[63] Continuation of Ser. No. 334,155, Oct. 25, 1994, abandoned, which is a continuation of Ser. No. 781,215, filed as PCT/FR91/00369 May 3, 1991, published as WO91/17447 Nov. 14, 1991, abandoned.

[30] Foreign Application Priority Data

May 7, 1990 [FR] France .................................. 90 05725

[51] Int. Cl.[6] ...................................................... G08C 19/04
[52] U.S. Cl. .......................... 340/870.11; 340/870.16; 340/825.15; 340/825.16
[58] Field of Search ........................ 340/870.11, 870.16, 340/870.17, 825.07, 825.11, 825.15, 825.16, 825.17, 669; 364/566; 324/102, 103 R, 113; 73/489

[56] References Cited

U.S. PATENT DOCUMENTS

| | | | |
|---|---|---|---|
| 4,092,633 | 5/1978 | Fletcher et al. | 340/669 |
| 4,750,197 | 6/1988 | Denekamp | 379/58 |
| 4,831,558 | 5/1989 | Shoup et al. | 340/825.07 |
| 4,845,464 | 7/1989 | Prori et al. | 340/566 |
| 4,862,394 | 8/1989 | Thompson et al. | 364/551.01 |

FOREIGN PATENT DOCUMENTS

| | | |
|---|---|---|
| 235534 | 9/1987 | European Pat. Off. . |
| 3643203 | 12/1986 | Germany . |
| 3643203 | 6/1988 | Germany . |
| 1508172 | 9/1989 | U.S.S.R. . |

*Primary Examiner*—Jeffery Hofsass
*Assistant Examiner*—Andrew Hill
*Attorney, Agent, or Firm*—Young & Thompson

[57] ABSTRACT

A method is disclosed for the monitoring of items of equipment by a user, of the type comprising the operations consisting of sensing stresses undergone by the items of equipment, recording signals corresponding to these stresses, then reading out these signals after possible processing. The device is of the type comprising at least one sensor connected to a recorder assembly equipped with a microprocessor, memories, a time stamp, device for programming the microprocessor and device for reading out stored data. It is characterized in that one memory is intended to contain programs for data acquisition and processing, another memory is intended to contain rules and specific data selected by a user and constituting a specific job, which memory is on the one hand in a state of permanent back-up as soon as the rules and specific data are effectively stored and on the other hand protected against access by any person other than the user, the device also comprising a memory which is to contain data from the sensor or sensors as well as a device for selective access to the memories associated with a condemnation device capable of being neutralized by the user only.

13 Claims, 9 Drawing Sheets

PROCESS FOR MONITORING EQUIPMENT AND DEVICE FOR IMPLEMENTING SAID PROCESS

This application is a continuation of application Ser. No. 08/334,155, filed Oct. 25, 1994, now abandoned which is a continuation of Ser. No. 07/781,215, filed as PCT/FR91/00369 May 3, 1991, published as WO91/17447 Nov. 14, 1991, abandoned.

FIELD OF THE INVENTION

The present invention concerns a device for the monitoring of stresses and strains which may be undergone by items of equipment: motors, mechanisms, mechanical assemblies, electrical and electronic appliances, etc.

BACKGROUND OF THE RELATED ART

During transport thereof, in particular, the objects transported are subject to physical and mechanical stresses such as acceleration, shocks, vibrations, heating, etc. These stresses can have serious consequences when the objects are costly and complex items of equipment which, after transport thereof, contribute to missions the failure of which may cause loss of human lives or of very expensive assemblies, which is the case with fields involving hostile or very stressful media: aeronautics, astronautics, underwater navigation, for example.

It is very important to know these stresses as well as the time when they occur.

Knowing the stresses makes it possible to discard the equipment concerned or to subject it to thorough tests such as those performed at the time of acceptance.

Moreover, knowing the time when the phenomenon arises makes it possible to avoid a repetition of it, by guarding against it for example by better packaging, and also to determine liabilities.

But transport and handling are not the only circumstances during which serious stresses may arise and which it is good to monitor.

It may be useful to know that a motor has been running with temporary overheating, although it has not given rise to any breakdown or even any alert.

Seals may have undergone stresses likely to reduce their future strength, without those responsible having the least actual and objective information allowing them to decide a priori to replace them.

For this, an important characteristic expected of an apparatus for monitoring stresses undergone by equipment is its autonomy.

Autonomous apparatuses for monitoring objects during transport thereof are already known.

J. KORELUS in the document QZ 25 (1980), vol. 4, "The transport shock measuring instrument—an accessory protective device for valuable goods," describes an apparatus for recording shocks undergone by valuable objects during transport thereof. This apparatus comprises three accelerometers the signals from which are added, an analogue-to-digital converter, a control logic device and storage registers, as well as a printer which displays, opposite the level of measured acceleration, the date and time of recording. The recording threshold is adjustable.

A major drawback of this apparatus is the use of a printer, a device which is not versatile, consumes a very high amount of energy and is relatively unreliable. Moreover, it is limited to a single method of measurement.

The patent EP-A-0 235 534 describes a recorder comprising:
three accelerometers,
clock means,
memories for storing programme instructions and data representing numerical signals generated by the three accelerometers and by the clock means,
transmission means for communicating numerical data to an external device,
microprocessors connected to the above means,
a power supply.

This recorder reads cyclically the signals picked up, and stores them in a memory when their amplitude exceeds a predetermined threshold.

This apparatus therefore necessarily works permanently, which greatly limits its autonomy because it consumes so much energy that it is unrealistic to envisage using it for long periods, whether transport, handling or operation is concerned.

Moreover, no processing, particularly compression, being carried out on the signal provided by the accelerometers before storing it, a signal with a duration of 50 milliseconds occupies 960 octets in the memory, and the storage capacity of the apparatus is limited to about a hundred signals.

Patent document DE-A-3 643 203 describes a device including an accelerometer (or acceleration sensor) and a recorder with memory of which the electronics comprise an amplifier, a digitizer and a microprocessor. These electronics are activated, that is, supplied with power, only when the sensor delivers a signal indicating an acceleration the value of which exceeds a programmable threshold. This apparatus activated by the phenomenon to be measured needs a certain time to adopt its operating conditions, and there is a risk of missing the start of rapid phenomena. Moreover, the recorder described does not process signals before storing them. The data are not protected and the apparatus is not "discreet", for it emits a warning sound signal systematically every time the threshold is exceeded.

We might also cite the document U.S. Pat. No. 4,750,197 which describes a built-in device for protection against theft of objects shipped in containers placed inside means of transport such as vehicles.

This device includes:
at least one sensor placed on each door of each container;
an autonomous active module placed inside the vehicle connected to the sensors, which comprises power supply means, means for processing the data which are transmitted to it such as the location of the vehicle, opening of the doors or on other parameters relating to the journey of the vehicle etc. and means for generating a reference signal at regular intervals of time;
a central data processing unit independent of the vehicle for managing and checking the data transmitted or received by the module;
means of connection between the vehicle and the central processing unit such as a radio or a telephone.

This device which is primitive and complicated does not make it possible to ensure monitoring of the objects transported in respect of the stresses to which they are subject (mechanical strains, variations in physical parameters such as temperature, humidity, etc.).

Furthermore, this device is operational only after a check by the central processing unit, once and for all during the whole voyage, that all the sensors and the module are working properly, that is, before departure of the vehicle, which makes the reality of monitoring uncertain and random, since possible breakdowns of the sensors are not detected.

The central processing unit periodically checks the state of operation of the module on board, which does not make it possible to detect the unpredictable and sudden trend of variation of a parameter.

This principle supposes that the events monitored are necessarily likely to last longer than an interval between two checks, which is the case in particular with burglaries. The result is that monitoring is not ensured permanently, which may be highly prejudicial to the objects transported, particularly if they are fragile.

SUMMARY OF THE INVENTION

It is the object of the present invention to provide a device which does not have the disadvantages set forth above, which is at the same time usable for very long-term monitoring assignments, which is accurate, discreet and safe and which is protected against unauthorized or even fraudulent manipulations.

For this purpose, the invention relates to a method for the monitoring of items of equipment by a user, of the type comprising the operations consisting of sensing stresses undergone by said items of equipment, recording signals corresponding to these stresses, then reading out these signals after possible processing, characterised in that:

the rules of the job are stored in a volatile memory and these rules are saved, while the sensor or sensors are in a so-called "suspended" state, the date and time at which the job is started are stored, that is, the moment when the sensor or sensors are changed from the suspended state to a so-called "monitoring" state, a recorder assembly is changed from the monitoring state to a so-called "acquisition" state corresponding to effective data recording, when the signal from a sensor exceeds a certain threshold, signals representing stresses and/or conditions of use of the equipment are sensed, and at least some data are recorded in real time according to a set of rules selected by the user and constituting a specific job, access to the rules of this job is prohibited for third persons and, in particular, for an operator having custody of the equipment, and access to the data recorded according to the rules of the job is given at the exclusive request of the user.

According to other characteristics of this method:

several sensors are placed and the data of only some of them are recorded;

any event which may have the effect of neutralizing or activating each of the sensors placed is recorded;

on the one hand upon request and on the other hand before any recording operations, individual functioning of all the sensors necessary for the specific job is checked;

the duration of stresses and/or conditions of use is calculated for several measurement values determined by the user.

The invention also relates to a device for the monitoring of items of equipment by a user, of the type comprising at least one sensor connected to a recorder assembly equipped with a microprocessor, memories, a time stamp, means for programming the microprocessor and means for reading out stored data, characterised in that one memory is intended to contain programs for data acquisition and processing, another memory is intended to contain rules and specific data selected by a user and constituting a specific job, which memory is on the one hand in a state of permanent back-up as soon as said rules and specific data are effectively stored and on the other hand protected against access by any person other than the user, the device also comprising a memory which is to contain data from the sensor or sensors as well as means for selective access to the memories associated with condemnation means capable of being neutralized by the user only.

According to other characteristics of this device:

sensors connected to the recorder assembly have a circuit for checking their functioning, for bringing about recording in the memory of data indicating that they are working or not working;

it comprises circuits for backing up the memory for storing the rules, the memory for storing sensed data, as well as the time stamp when the device is in a so-called "suspended" state or when the power supply (1041) of the device is insufficient;

it is in a so-called "monitoring" state when its memories effectively contain program and job data, the device comprising circuits which make it possible, in the monitoring state, to deselect members connected to the microprocessor such as memories, time stamp, keyboard, display screen, sound warning device or others, for the purpose of saving the power supply;

it is in a so-called "acquisition" state when any of the sensors receives a signal with a value greater than that of a predetermined threshold stored in the memory;

it comprises three accelerometers mounted in a trihedron to provide signals to be filtered by three sets of three different bandpass filters, mounted in parallel, the signals from the identical filters of each set to be added by means of circuits before being transmitted to three inputs of the microprocessor;

it comprises at least six sensors including three accelerometers and at least three other sensors such as a temperature sensor, a pressure sensor and a humidity sensor, all connected to the same number of inputs of the microprocessor;

it comprises at least one pilot lamp which is lit up if the value of a recorded signal is greater than a predetermined programmed threshold and, if occasion arises, when a person acts on a means for control of lighting up.

BRIEF DESCRIPTION OF THE DRAWINGS

The invention will be better understood by the detailed description below, given with reference to the attached drawings. Of course, the description and drawings are given only as an indicative example without limitation.

DESCRIPTION OF PREFERRED EMBODIMENTS

Figure 1:
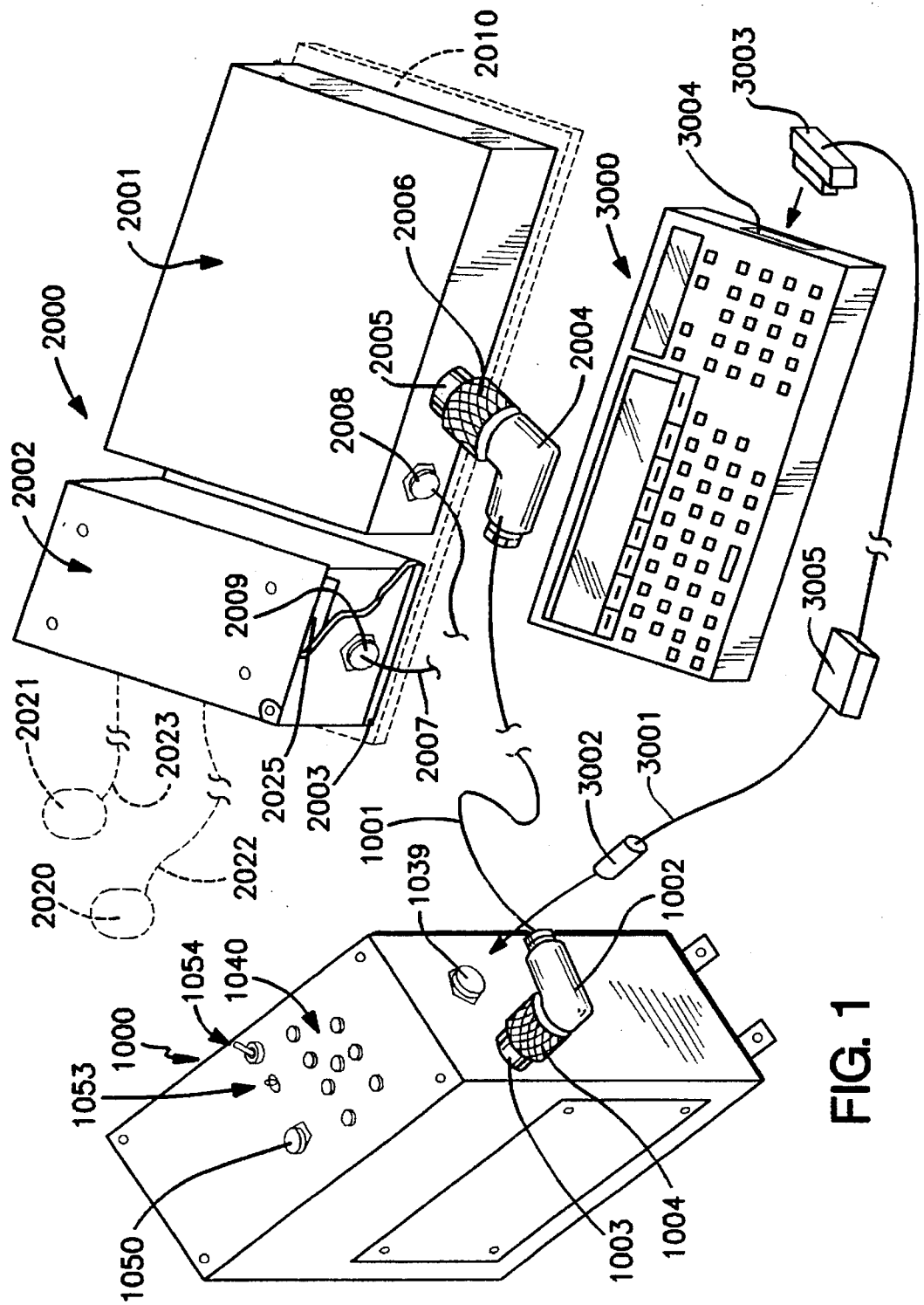
FIG. 1 is a schematic general view of a device according to the invention comprising a microcomputer for loading the programmes corresponding to the various possible jobs.

Referring to the drawings, it can be seen that a method according to the invention is embodied in a device which comprises an electronic assembly 1000 and a sensor assembly 2000, itself composed of a sealed housing 2001 and a housing 2002 the interior of which communicates with the external environment via an opening made here in the form of a slot 2003. The housing 2001 contains sensors which are active even when they are enclosed in a housing, which is the case, in particular, with accelerometers. The housing 2002 contains sensors which can be active only if their sensitive element is in connection with the environment, which is the case with thermometers, pressure gauges, hygrometers, anemometers, etc.

The electronic assembly 1000 can be placed in a place fairly remote from the sensor assembly 2000. These assemblies are connected by an electric cable 1001 provided with connectors 1002 and 2004 which are preferably sealed so that the electrical connection cannot be disturbed. For the same reason, it is good to provide a fixing mechanism resistant to traction and vibrations, which is obtained by connectors of the type comprising a sleeve 1003–2005 screwed onto a connector (not visible in the drawings) integral with the housings and operated by a milled bush 1004–2006.

The housings 2001 and 2002 too can be situated more or less far from each other according to the characteristics of the corresponding sensors and the situation of the equipment monitored. They are connected by an electric cable 2007 passing through the walls of the housings 2001 and 2002 by robust, sealed connections 2008 and 2009.

The housings 2001 and 2002 can also be situated side by side, for example by being fixed to the same base 2010 shown in dotted lines.

The sensors themselves can be variously placed according to the circumstances of the jobs. This is evoked by sensors 2020 and 2021 situated at the end of wires 2022 and 2023 of any lengths making it possible to place on the one hand each sensor 2022–2023 (possibly associated with electronic components) and on the other hand each housing 2001–2002 in the best possible positions.

If the job comprises only the monitoring of shocks and vibrations, accelerometers and consequently a single housing 2001 will be sufficient.

This independence is made possible by providing inside the housing 2001 and the housing 2002 respectively the electronic components specific to the sensors which are associated with them, that is, in the example shown, the accelerometers for the housing 2001, and the thermometer, the pressure gauge and the hygrometer for the housing 2002.

In practice, the assembly 1000 contains all the components necessary for recording the data provided by the sensors when they are in the state of acquisition as well as supply: microprocessor, RAM and ROM memories, power supply properly speaking by means of batteries and power supply specific to signalling means such as pilot lamps. As an example, a battery of 6 volts and 20 amperes ensures operation of the device for two months, owing to deselection of unnecessary components when not in a state of acquisition, as will be described below. A connector 1050 of the sealed type is also provided so as to be able to connect an external power supply (not shown) to the assembly 1000 if necessary, this power supply being of any known type and not therefore described in detail.

Nevertheless, for the sake of simplicity of the account, the description of diagrams below assumes that the assembly 1000 contains all the electronic components while the assembly 2000 contains the sensors properly speaking.

When the sensors of the housing 2002 are situated inside it, the electronic components are advantageously grouped on one or more boards 2025 fixed far from the point at which the slot 2003 is located in order for these components to be sheltered from dust and other agents capable of passing through the slot 2003 and of a nature harmful to proper functioning of the components. If necessary, the board or boards are placed in a protective casing.

Figure 2:
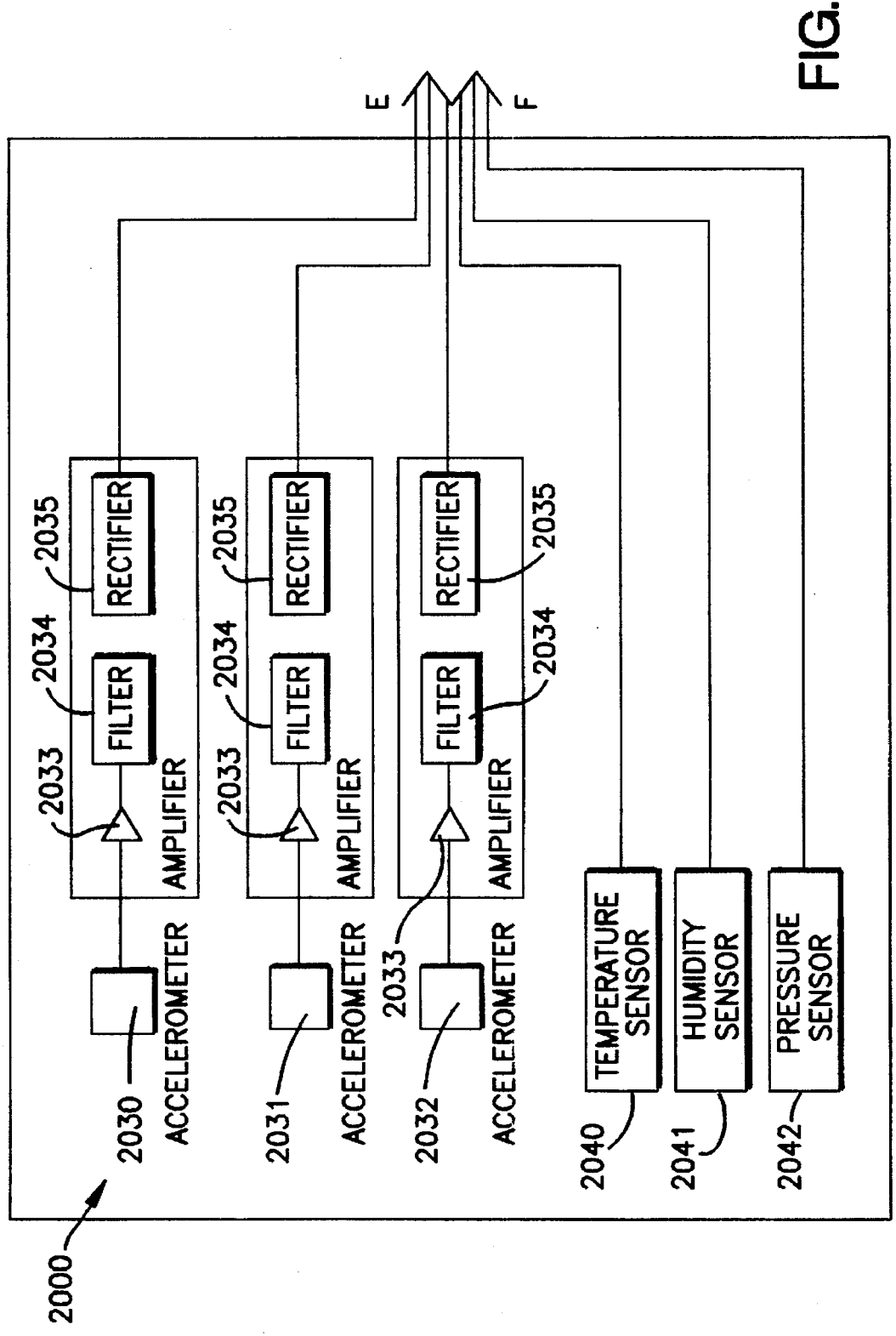
FIG. 2 is, in a first embodiment of the invention, a block diagram of a sensor.

In a first embodiment of the invention, it can be seen in FIG. 2 that the sensor assembly 2000 comprises six sensors:

- three accelerometers 2030, 2031 and 2032 sensing the accelerations along three orthogonal axes x, y, z, corresponding to the three directions of space, each connected to an amplifier 2033, a so-called "BUTTERWORTH" filter 2034 and a rectifier 2035. The pass band of the filter 2035 is between 0.5 and 120 Hz and the attenuation is 30 dB per octave;
- three sensors 2040, 2041 and 2042 for temperature, humidity and pressure, three quantities of which the variations are generally slow, wherein the signals which come from these sensors may be sampled at low frequencies programmable according to the job.

The six channels corresponding to the six sensors 030, 2031, 2032, 2040, 2041 and 2042 are connected to the input E of the electronic assembly 1000.

It is noted that the three accelerometers 2030, 2031 and 2032 are in fact considered as three different sensors, contrary to the present state of the art which instructs the use of a single accelerometer or else the use of three of them, but in that case integration of their results in a single usable signal.

Figure 3:
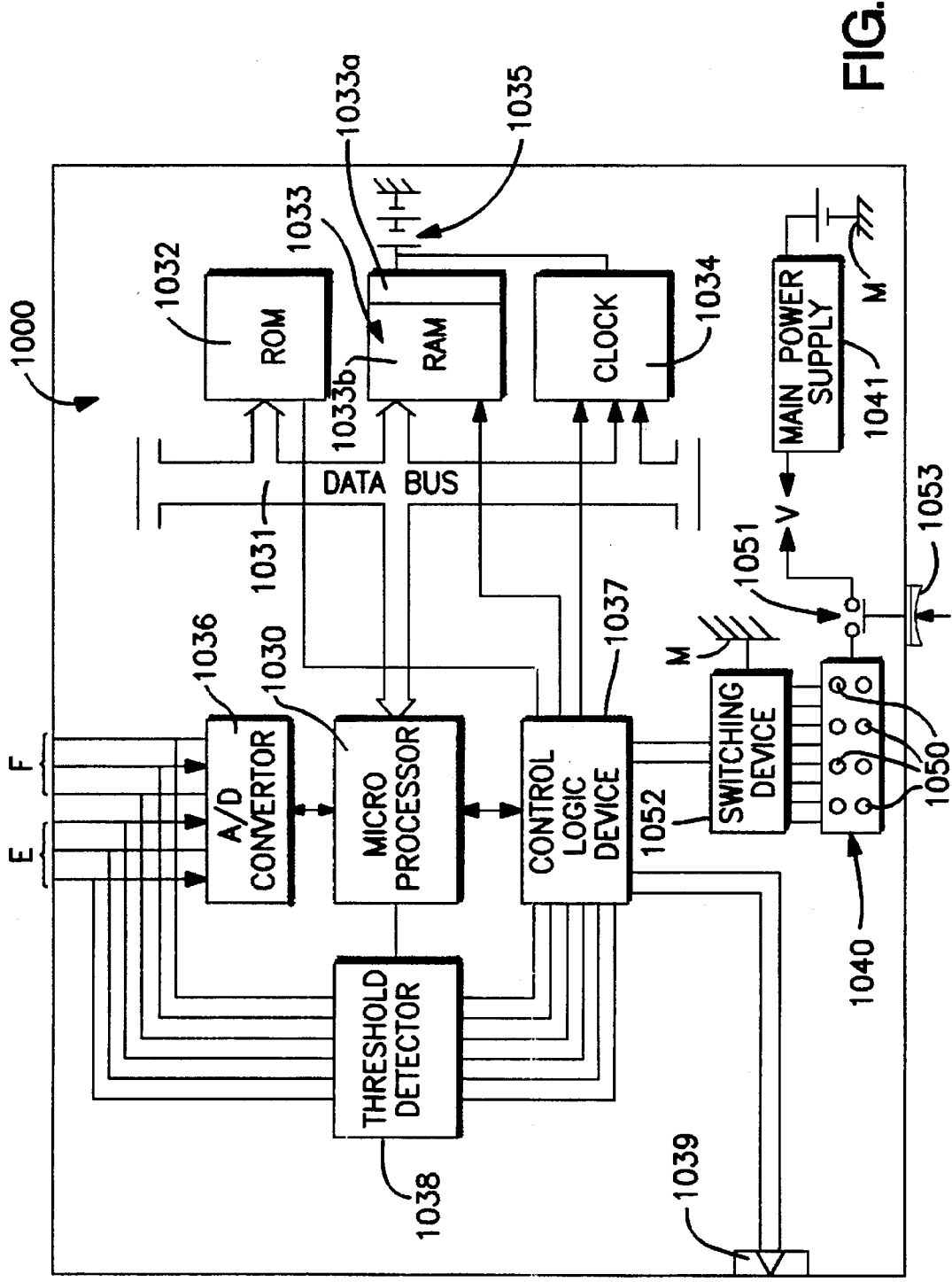
FIG. 3 is, in a first embodiment of the invention, an electronic block diagram.

In FIG. 3, it can be seen that the electronic assembly 1000 comprises the following components:

- a microprocessor 1030 connected to a data bus 1031 to which are connected a rapid-access read-only memory 1032, a volatile random-access memory 1033, and a time stamp 1034, the latter two components 1033 and 1034 being connected to a back-up battery 1035;
- an analogue-to-digital converter 1036 which converts to digital signals the analog signals arriving at the input E and coming from the sensor assembly 2000;
- a control logic device 1037 which is connected to threshold detector means 1038 (operation of which will be described below), to a series connection of the type known under the reference "RS 232" ending in a connector 1039 and to a pilot lamp assembly 1040;
- a power supply 1041 which supplies the assembly with electrical power.

The memory 1033 is to contain two types of data, and in fact it comprises two separate zones: 1033a for containing data corresponding to the rules and specific characteristics of a job and 1033b for containing the data received from the sensors and corresponding to the programme necessary for accomplishment of the job. The zone 1033a may, for example, represent 1/16 of the capacity of the memory 1033 and the zone 1033b, 15/16.

Naturally, two separate memories could also be used instead of two zones of one memory, the choice between the two solutions being within the scope of anyone skilled in the art.

As stated above, the random-access memory 1033 as well as the time stamp 1034 are connected to a back-up battery 1035. The latter may be of a common type capable of ensuring protection of the memory 1033 and of the time stamp 1034 for one year. In other words, the data corresponding to the rules and specific characteristics of a job may be kept for one year, even if the device is not used but, for example, stored while waiting to be used and thus available at any time.

The operations of reading and writing in the random-access memory 1033 are protected by any known means such as passwords, so that only the authorised user can control definition of the monitoring job.

In FIGS. 2 and 3 can be seen a deselection system which prevents the entry of data in the memory 1033 when the main power supply 1041 is insufficient, or even zero, in order to avoid recording errors.

Figure 4:
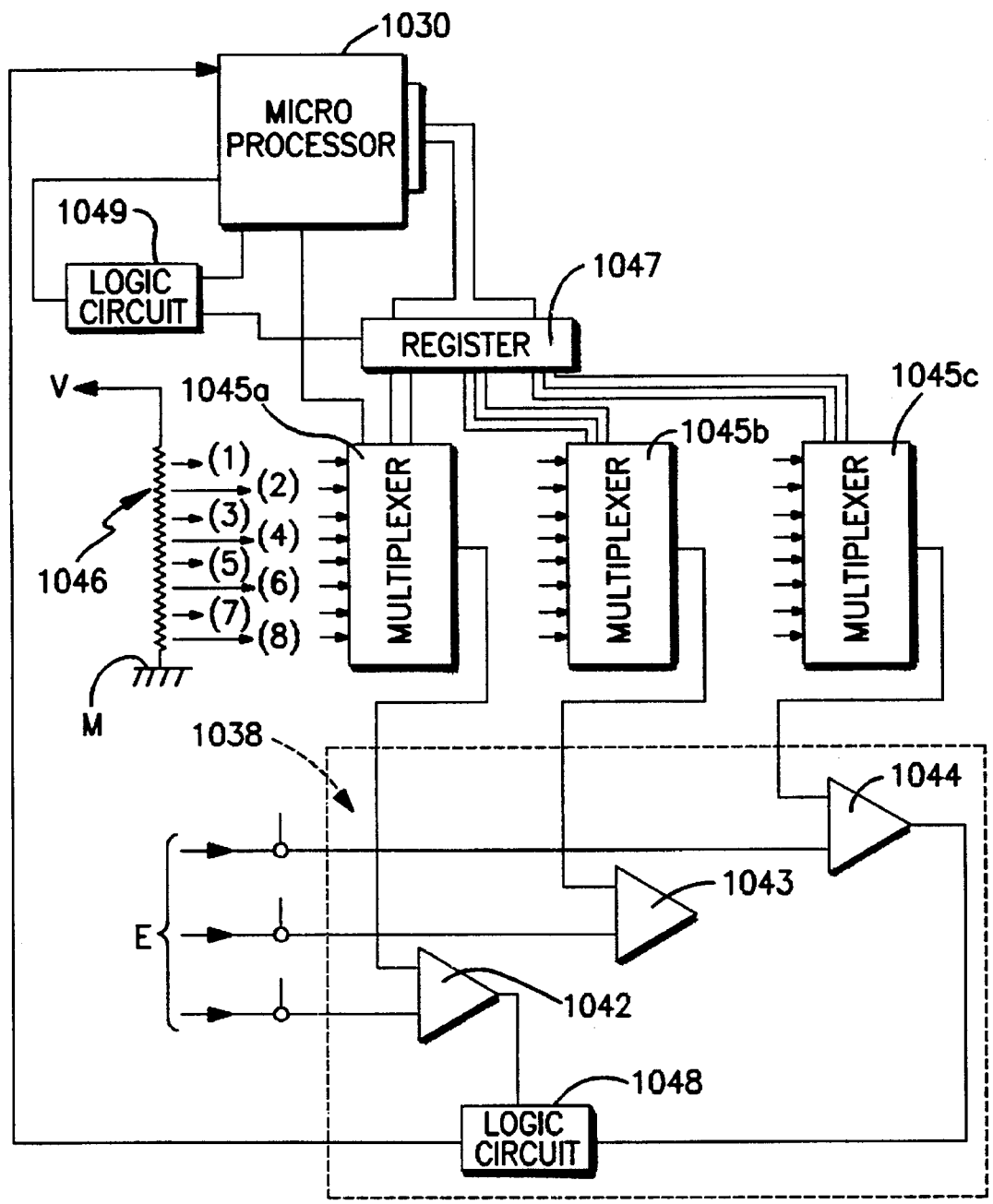
FIG. 4 is a diagram of the detector circuits and their control logic device.

The detection means 1038 (FIG. 4) comprise three threshold detectors 1042, 1043 and 1044, the first inputs of which are connected to the channels from the three accelerometers 2030, 2031 and 2032 and the second inputs of which are connected to the outputs of three analog multiplexers 1045a, 1045b and 1045c. The output voltage of each multiplexer is selected individually from among a set of eight voltages derived from a resistance bridge 1046 connected by one of its ends to the regulated power supply 1041 and at the other of its ends to earth M. This bridge 1046 has eight outputs (1) to (8) staggered and corresponding to the eight desired voltages.

The multiplexers 1045a, 1045b and 1045c are numerically controlled. The three bits of information necessary for the control of each multiplexer are entered by the microprocessor 1030 in a lockable register 1047, this register 1047 having an 8-bit standard, one of the control inputs of one multiplexer is connected directly to one output of the microprocessor 1030. The outputs of the threshold detectors 1042, 1043 and 1044 are connected to a logic circuit 1048 and, when the amplitude of one of the signals from one of the accelerometers 2030, 2031 or 2032 exceeds the programmed threshold value for this detector, an interrupt signal is transmitted by a logic circuit 1049 to the microprocessor 1030. The register 1047 is locked and unlocked by the microprocessor 1030 by means of the logic circuit 1049.

As can be seen in FIG. 3, the pilot lamp assembly 1040 comprises eight light-emitting diodes 1050 which have fixed lighting and different colours. One input of these diodes is connected to the power supply 1041 by a circuit which comprises a circuit breaker 1051 and the other input is connected to a switching device 1052 itself connected to the control logic device 1037. The diodes 1050 are continuously off, and light up only when the operator presses on the control for the circuit breaker 1051, for example, a push button 1053 accessible from outside an enclosure containing the device.

In order to facilitate operation, particularly when the device is placed in an inaccessible place such as a sealed container, the need to act on the push button 1053 in order to cause the diodes 1050 to light up can be eliminated: they light up automatically as soon as a critical threshold is reached or exceeded but, to save energy and hence ensure autonomy as long as possible, the diodes 1050 may flash, lighting up for 1/10 second every 10 seconds, for example.

Light-up of a diode 1050 of the pilot lamp assembly 1040 shows that the equipment monitored has undergone stresses exceeding a level selected according to a code known to the user only.

The connector 1039 makes it possible to connect the device to an external computer 3000 (FIG. 1), the exchange of data being made in series according to the standard RS 232. For this purpose, the computer 3000 and the electronic assembly 1000 are connected by means of an electric cable 3001 provided at both of its ends with connectors 3002 and 3003 allowing connection to the connector 1030 on the one hand and to a connector 3004 of the computer 3000 on the other hand.

It should be noted that the connector 1039 is preferably consistent with the standard RS 232, but that it is advantageous, here, for it to be protected against damp, or even rain or immersion, while the connector 3004 can be standard because transfer of data from the computer 3000 to the electronic assembly 100 can be done without problems in a place sheltered from aggressive ambient conditions.

Between the external computer 3000 and the assembly 1000, there is advantageously inserted a level adaptor 3005 of a type known in the art for achieving the transmission of data between these two necessarily separate apparatuses. This adaptor is preferably designed so as not to consume energy from the power supply 1041, for example by being connected to its own battery.

In order to facilitate the description of operation below, an example of use of the device will now be taken.

A manufacturer of complex equipment, for example aircraft, often constructs the whole assembly from subassemblies manufactured in factories which are sometimes located very far away from the place of assembly. During transport thereof, the subassemblies can be subject to mechanical stresses, and there is a risk that these stresses will pass unnoticed or be concealed by the carrier.

In order to be forearmed against this risk, the manufacturer, who is the one referred to as the "user" here, delivers the device of the invention (assemblies 1000 and 2000) to a carrier who is the one referred to as the "operator" here, arranging it so that the latter does not know the operating conditions of the device and hence cannot modify the job. What is true of the carrier is all the more true of other persons in general.

Before a monitoring job, the user loads into the microcomputer 3000, preprogramming software which may be either standard (rules defined in advance) or application-configurable, so as to be able to select a set of rules and characteristics which together are to constitute a specific job and the variable parameters of which are:

the name of the operator, the model and references of the equipment transported, the model and references of the means of transport indicated by the operator, the date of departure, the place of departure, etc.;

the sensors activated and any which may be neutralised;

the level of the starting thresholds which cause on the one hand the last light-up of an alarm diode and on the other hand storage of the data (value, peak, date, time);

the frequency of sampling so-called slow measurement channels;

the procedure for extracting from the recorder the data recorded since going into a state of acquisition, without erasing its contents.

The preprogramming software after being personalized is then transferred from the memory of the computer 3000 to the memory 1033a, which has been cleared beforehand, transfer being carried out by means of the RS 232 series connection via the connector 1039.

The external computer 3000 can then be disconnected: the cable 3001 is pulled out, and the device (assemblies 1000 and 2000) can be put in the so-called suspended state. The memory 1033 and the time stamp 1034 are backed up, as stated above, owing to the power supplied by the battery 1035.

At the start of a monitoring job, it is generally the operator who is in charge of putting the device into operation, either by operating a "start-stop" button 1054 (FIG. 1), or by connecting the batteries of the power supply 1041. In both cases, the device first of all passes through an intermediate "working state": the microprocessor 1030 files the address of the threshold voltages in the register 1047, deselects the memories 1032 and 1033 as well as the time stamp 1034, and enters in the memory 1033b the date and time of going into the monitoring state which then arises, due to the fact that the device is operational. This going into the monitoring state takes place without the operator or any of his agents being able to realize this change of state. It should be noted that in the monitoring state, energy consumption is greatly reduced.

When the analog signal delivered by any of the accelerometers 2030, 2031 and 2032 exceeds the threshold of one of the detectors 1042, 1043 or 1044, an interrupt signal is transmitted by the logic circuit 1037 to the microprocessor 1030 which changes to the state of acquisition and selects the memories 1032 and 1033 as well as the time stamp 1034. The analog signals from the accelerometers 2030, 2031 and/or 2032 are then converted to digital signals by the analog-to-digital converter 1036.

In practice, it is good to provide that the sampling frequency is variable as desired during manufacture of the device, in order to be capable of being adapted to the requirements of every user.

Thus, this sampling frequency may be adjusted to 800 Hz, for example, for the three accelerometers 2030, 2031 and 2032.

The maximum amplitude value of the phenomenon sensed by each of the accelerometers 2030, 2031 and 2032 is then calculated and recorded in the memory 1033b with corresponding indication of the time stamp 1034.

A device according to the invention can store 3,750 shocks, that is, the peaks of the three accelerations picked up by the accelerometers, with their dates expressed in hours, minutes and seconds. Such a device can also store a smaller number of shocks and store the temperature, pressure and humidity data, for example, 3,000 shocks, 2,000 temperatures, 2,000 humidities and 2,000 pressures.

Figure 5:
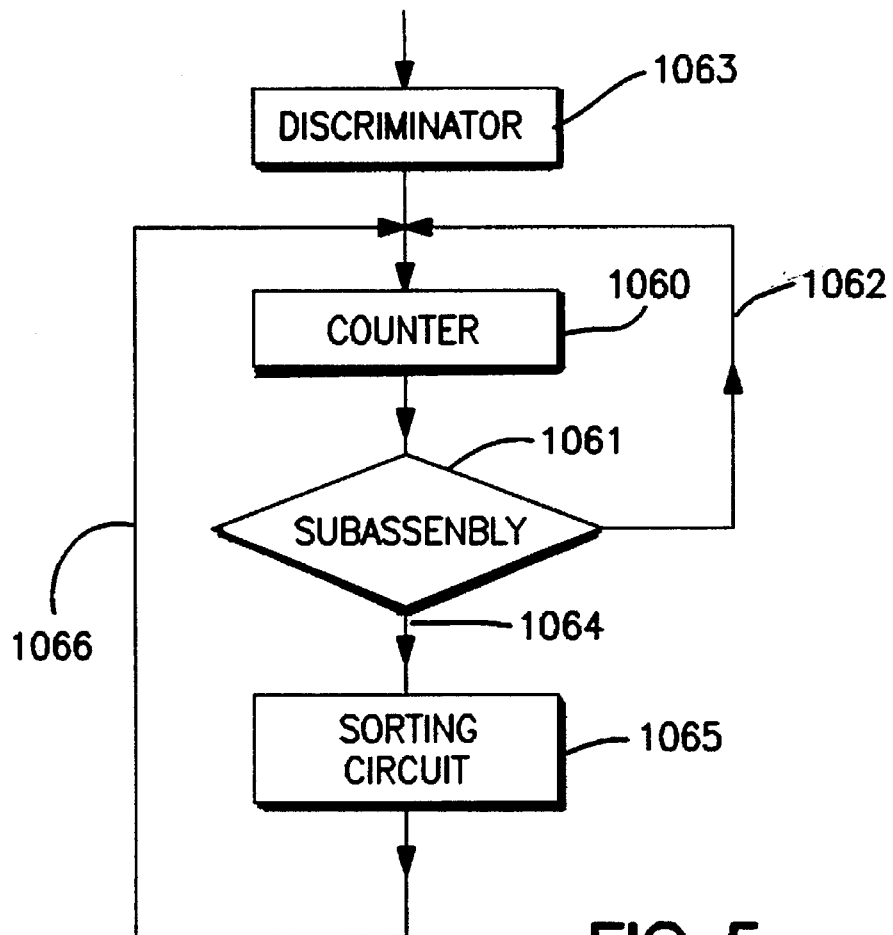
FIG. 5 is a partial flow chart concerning the sorting programme.

In order to avoid saturation of the memory 1033b, a sorting procedure is used. As can be seen in FIG. 5, a counter 1060 counts the number of shocks and this number is compared with a predetermined number entered in a subassembly 1061.

When the number of shocks recorded is lower than the predetermined number, a signal is emitted by the subassembly 1061 on a line 1062 ending in a discriminator 1063, so that the latter can authorize recording in the memory 1033b.

When the number of shocks recorded becomes higher than the predetermined number, a signal is emitted by the subassembly 1061 on a line 1064 ending in a circuit 1065 so that the latter can run a sorting function by the discriminator 1063 to which the circuit 1065 is connected by a line 1066, so as to eliminate from the memory 1033b the least interesting data on the basis of predetermined rules stored either in the memory 1032 (standard programme) or in the memory 1033a (rules specific to a job). For example, only the peaks or the peaks of the recorded means can be kept in the memory 1033b.

At the end of the job, the user receives the equipment. He connects to the connector 1039 of the assembly 1000 the external computer 3000 which was already used before the job and in which the user has now loaded software for recovery of the data contained in the memory 1033b. He transfers the data from this memory 1033b to the memory of the external computer 3000 by the connection RS 232. The data can then be processed and filed.

Figure 6:
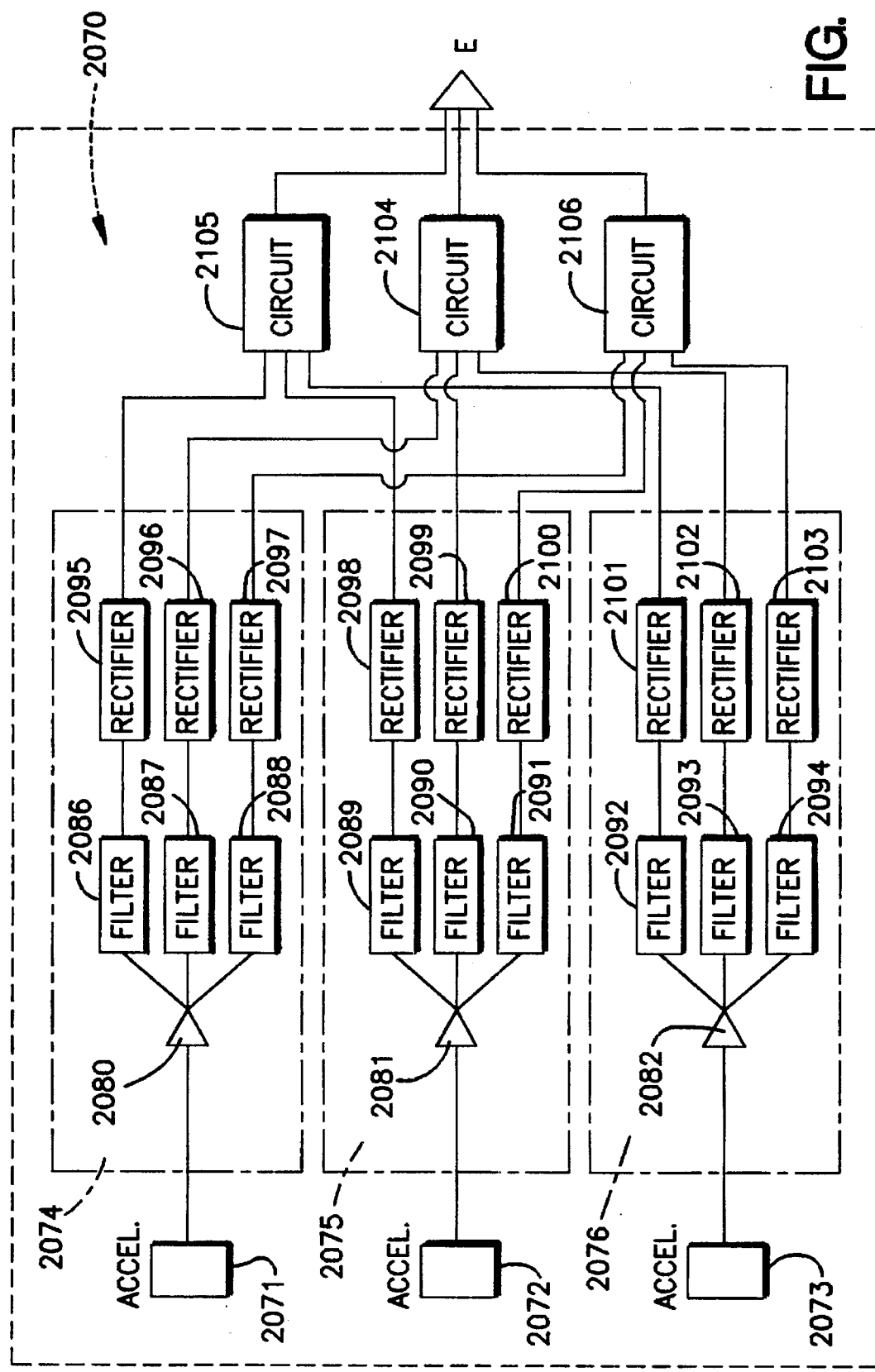
FIG. 6 is, in a second embodiment of the invention, a block diagram of a sensor.

In a second embodiment of the invention, FIG. 6 shows that a sensor assembly 2070 comprises three accelerometers 2071, 2072 and 2073 sensing the accelerations along the three coordinates x, y, z, and connected to three separate subassemblies 2074, 2075 and 2076 which each comprise an amplifier 2080, 2081 and 2082 respectively, preceding three bandpass filters 2086, 2087 and 2088, 2089, 2090 and 2091, 2092, 2093 and 2094 mounted in parallel and covering the pass bands from 0.5 to 25 hertz, 25 to 100 hertz and 100 to 1,000 hertz respectively.

Figure 7:
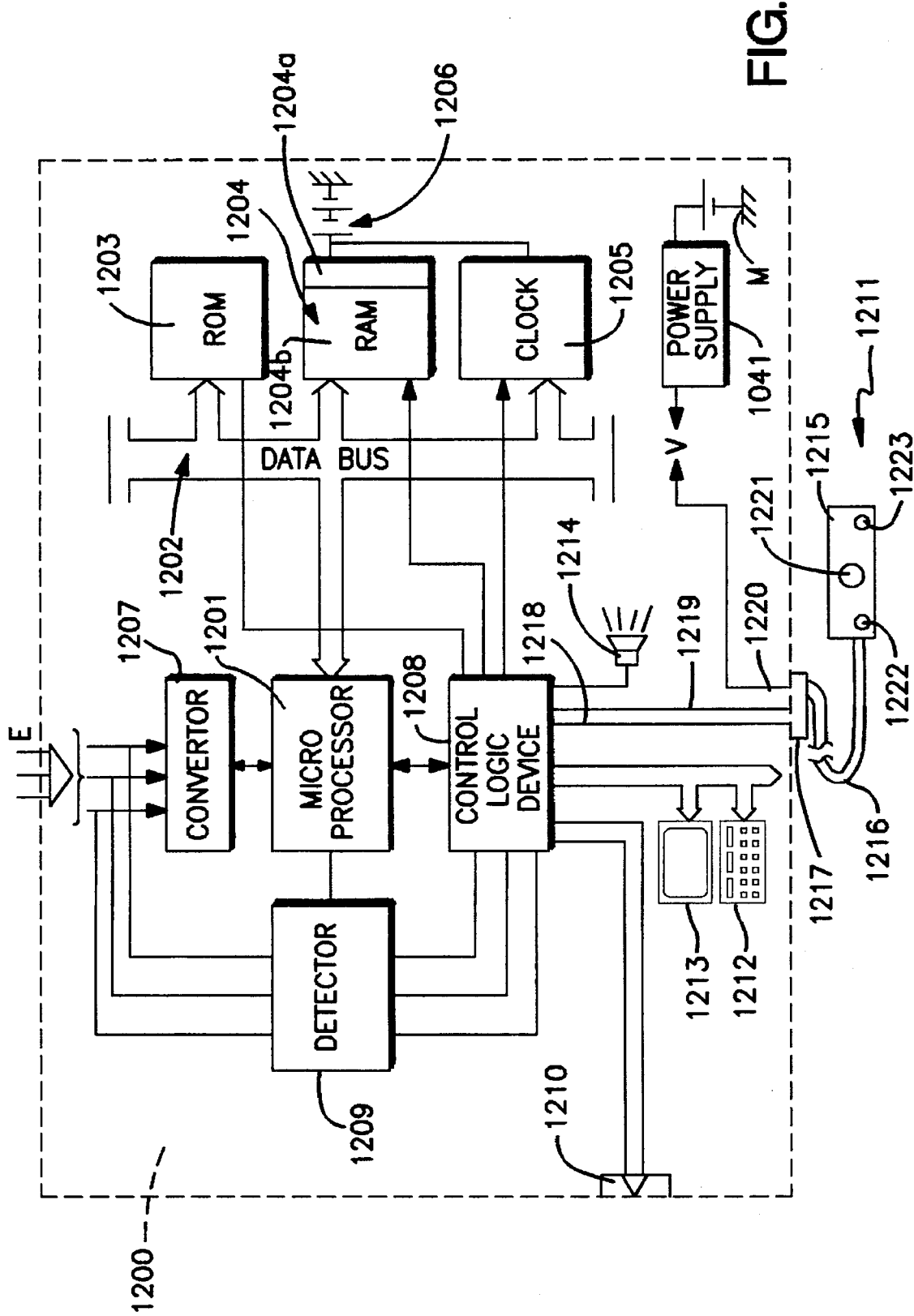
FIG. 7 is, in a second embodiment of the invention, an electronic block diagram.

The bandpass filters 2086 to 2094 are followed by a rectifier 2095, 2096, 2097, 2098, 2099, 2100, 2101, 2102 and 2103 respectively. The outputs of each of the three channels corresponding to the lines:

|  |  |
|---|---|
|      | 2080-2086-2095 |
| (I)  | 2080-2087-2096 |
|      | 2080-2088-2097 |
|      | 2081-2089-2098 |
| (II) | 2081-2090-2099 |
|      | 2081-2091-2100 |
|      | 2082-2092-2101 |
| (III)| 2082-2093-2102 |
|      | 2082-2094-2103 | are respectively added in circuits 2104, 2105 and 2106, the outputs of which are connected to the input E of an electronic assembly 1200 shown in FIG. 7.

The bandpass filters 2086 to 2094 are BUTTERWORTH filters, the attenuation of which is 18 dB per octave.

In this second embodiment, as can be seen in FIG. 7, the electronic assembly 1200 comprises:

a microprocessor 1201 connected to a data bus 1202 to which are connected a rapid-access read-only memory 1203, a random-access memory 1204 and a time stamp 1205, the latter two components 1204 and 1205 being connected to a back-up battery 1206;

an analog-to-digital converter 1207 which is to convert to digital signals the analog signals arriving at the input E from the sensor assembly 2070;

a control logic device 1208 which is connected to threshold detector means 1209, operation of which has been described in detail, to an RS 232 series connection ending in a connector 1210, to a pilot lamp assembly 1211, to a keyboard 1212, to a display screen 1213 and to a sound warning device 1214;

the power supply 1041 which supplies the whole assembly.

The pilot lamp assembly 1211 is carried separately in a small housing 1215 connected to the control logic device 1208 by a cable 1216 with connector 1217 comprising the connections 1218 and 1219 with the logic device 1208 and the connection 1220 with the power supply 1041.

The housing 1215, situated within reach of the operator, comprises a push button 1221 and only two pilot lamps 1222 and 1223.

A control member may also be provided, such as a power transistor which triggers starting of an apparatus performing a function: refrigerator compressor, fan, motor or pump of any kind ensuring the safety and/or continuity of operation of the equipment monitored.

As already described with reference to FIG. 3 for the memory 1033, the memory 1204 comprises two different zones: 1204a for the data corresponding to the rules and characteristics of a job and 1204b for the data received from the sensors and corresponding to accomplishment of the job.

Two components of the assembly 1200 which did not form part of the first embodiment of the invention, namely the keyboard 1212 and the screen 1213, will now be described in more detail.

The keyboard 1212 is of the flat, sealed, non-touch-sensitive, adhesive type and comprises fourteen keys:

--- ten number keys (O to 9), one "*" key   ⎤
one "#" key   ⎦ these for dialogue with the keyboard program one key allowing interruption of the microprocessor 1201 so as to be able to interact with it,
one "TEST" key connected to the pilot lamps,
one "start-stop" switch,
one switch for connecting a buzzer of a type known in the art.

---

The screen 1213 is advantageously a liquid crystal screen.

Figure 8:
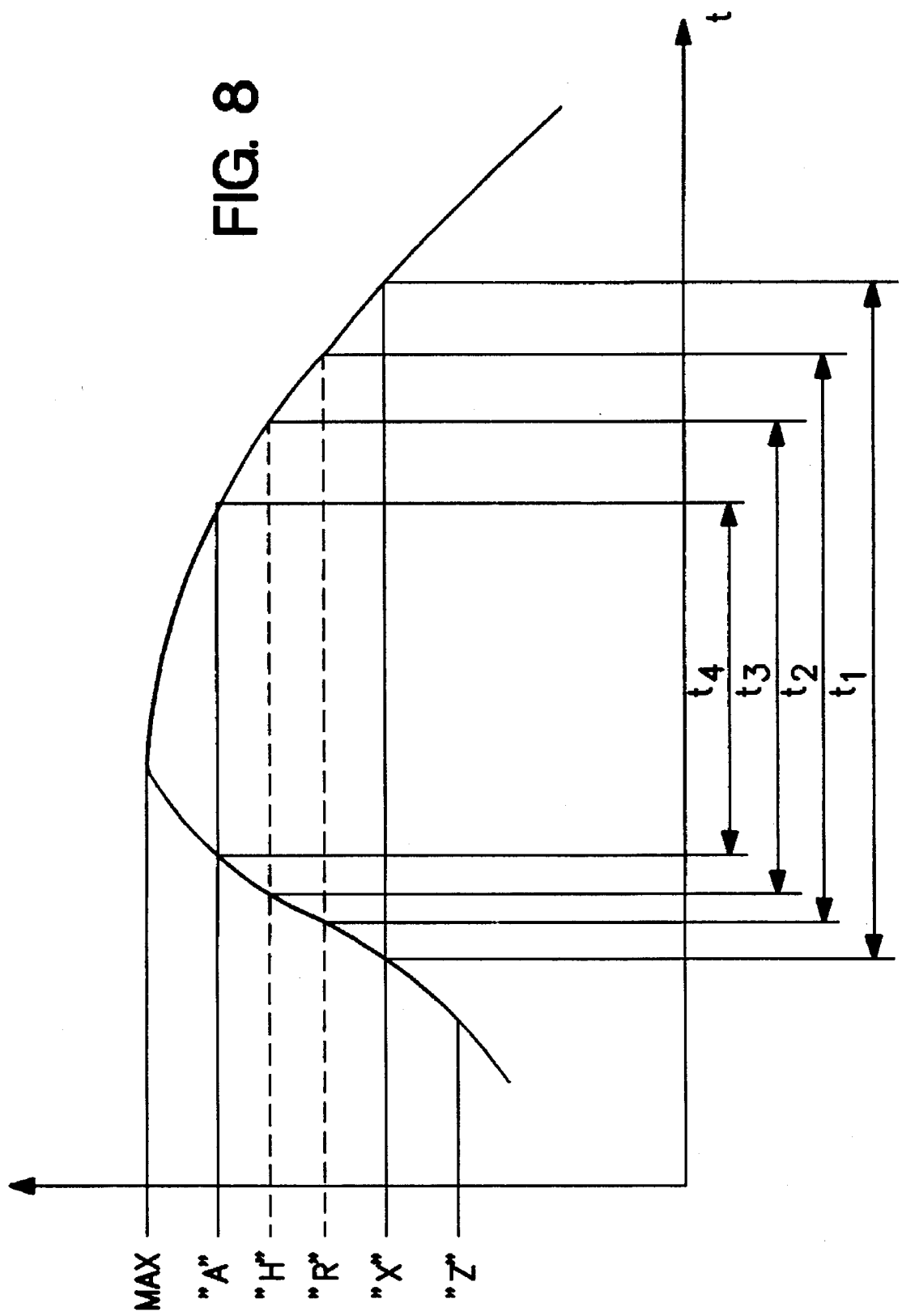
FIG. 8 is a diagram illustrating measurement levels.

In this second embodiment, the microprocessor 1201 calculates for each channel not only the maximum value of the phenomenon, but also the duration of this phenomenon. As can be seen in FIG. 8, the duration of the phenomenon is measured, on each of the three channels, for four levels, that is, in the end twelve levels: a top level "A" and a bottom level "X" are programmed by the user and two intermediate levels "H" and "R" are calculated by the computer. Four corresponding durations for the phenomenon are therefore obtained for each channel: t1, t2, t3 and t4.

With this embodiment, the threshold "Z" for starting recording (going into a state of acquisition) is determined by the computer, so that it is lower than the bottom level "X" according to a certain percentage, for example 0.8.

$$Z \leq 0.8 \, X$$

With this embodiment, the read-only memory 1203, the memory 1204, the time stamp 1205, the keyboard 1212, the liquid crystal screen 1213 and the warning device 1214 are deselected when the device is in the monitoring state.

The algorithm for acquisition and processing contained in the read-only memory 1203, according to the example already described, is essentially based on the very precise duration of an instruction in assembly language, and the three channels are sampled at frequencies approximately equal to 7,000 Hz, 700 Hz and 175 Hz, the highest frequency corresponding to the channel which filters the highest frequencies of the signals.

The shock is sampled for a predetermined time D, except in cases where, on the three channels, the signal remains below the bottom level for a time d which is also predetermined. Typical values of D and d are 10 seconds and 2.4 seconds respectively. Each event is filed on 32 octets, an event comprising:

---

| | |
|---|---|
| the date and time | = 5 octets |
| the peak of channel 1 | = 1 octet |
| the peak of channel 2 | = 1 octet |
| the peak of channel 3 | = 1 octet |
| the duration of the phenomenon for the four levels and for the three channels, that is, in total: | |
| | 12 levels = 24 octets |
| for each of the three channels, during each event, the times are totalled and filed in storage registers. | |

---

Thus, in the portion 1204b of the memory 1204 with a capacity limited to 32 kilooctets, of which the portion 1204a is reserved for the rules selected by the user to determine a job, up to 1,016 events can be stored.

When this figure is reached, the computer automatically starts the sorting routine described above and files the most important events at the top of the memory 1204b, a pointer being positioned in the middle of the memory 1204b for continuation of the job.

The keyboard 1212 makes it possible to enter in the memory 1204a:
- the top and bottom thresholds for each of the channels;
- the threshold of the sound warning device 1214 associated with the assembly of diodes 1211;
- the date and time.

By making use of the keyboard 1212, one can display on the screen 1213:
- the maximum of the peaks on each of the three channels;
- the value of the last acceleration which triggered the sound warning device 1214;
- the state of the three channels.

The operations of reading and writing in the memory 1204 are authorized only for persons having the appropriate passwords.

It follows from the description above that a device constructed by the method according to the invention allows long-term monitoring with the highest security guarantees.

In particular the operator, not knowing the exact terms of the job, cannot intervene in any way to modify the results which will be supplied to the user.

One can, for example, imagine that a carrier wishes to conceal the speed at which the equipment is transported by road. He would be tempted to disconnect the sensors corresponding to the accelerometers. With the invention, the disconnection will be recorded, accompanied by the exact hour, minute and second of the time of this disconnection.

The user will inform the operator of this, and the latter will not be able to repeat the fraud under penalty of being permanently dismissed by the user, so that he will certainly take action among his own drivers. The next carriage will therefore be correct, that is, without any disconnection, but the operator will still not know what are the parameters monitored or not by the other sensors. It is quite possible to connect eight sensors but activate only six of them. The operator has no chance of knowing which sensors are active and which sensors are inactive. If he did know, he still could not know the thresholds considered as sensitive by the user.

Consequently, no indiscretion can make it possible to reveal which monitoring criteria the user has used.

A device according to the invention can be very compact and easy to accommodate. It can therefore be used not only on the occasion of transport but also during normal use of certain items of equipment.

It is in fact useful to know after a certain number of hours of operation for how long a motor has undergone overheating, how many shocks a shock absorber has received, what temperature peaks a seal has withstood, etc.

A user can very easily design, modify and finalize different jobs on a computer, because it is then sufficient to "inject" the corresponding program which will remain dormant during the suspended state and automatically put the device into the monitoring state after the short time of operation in the working state.

The accelerometers 2030, 2031 and 2032 comprise circuits for self-monitoring their good working order and the reality of their power supply, in order on the one hand to indicate their connection to and disconnection from the central processing unit 1030 and on the other hand to check that they are each in good working order.

This check is carried out for each of the accelerometers if and when only one of them triggers the state of acquisition. In fact, if an accelerometer transmits a signal, it is good to make sure that the other two are in working order in order to be certain that a single acceleration was undergone along only one of the three axes x, y or z, or that one of the other accelerometers was disconnected or out of order at the time. The user draws conclusions corresponding to the job from this information which is precise and strictly fixed in time. In practice, to simplify the circuits, it is acceptable to consider non-functioning of only one of the accelerometers as a general, disqualifying breakdown.

In this case, if one of the three accelerometers triggers a state of acquisition, they are all three checked and if one of them is inoperative, the whole device is considered to be broken down. According to the program adopted, a warning or alarm signal can then be triggered and the device can be put in the suspended state, the time of the incident being stored in the memory 1204b as date, hour, minute and second.

If, for example, an accelerometer is disconnected, the user finds out at the end of the job at what precise time this disconnection took place and can, by examining the sensors at the end of the job, check whether neutralization of the device results from a breakdown or from deliberate or accidental disconnection of an accelerometer.

The disconnection, in this case, is placed in the same category as a total absence of power or complete failure of the accelerometer, and there follows disqualification of the device in its entirety, with or without alarm, according to the program chosen for this major incident.

Figure 9:
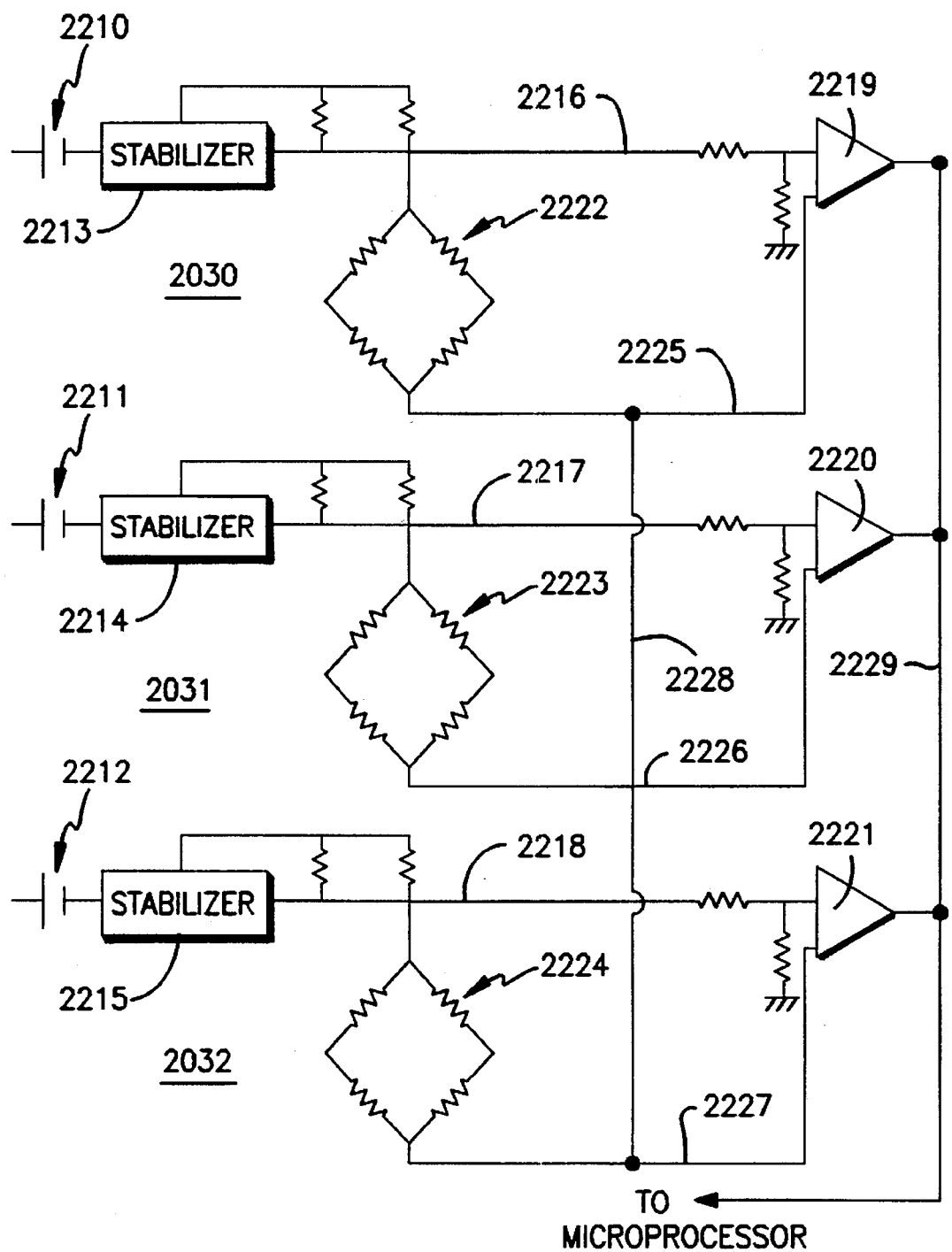
FIG. 9 is a diagram of the self-monitoring circuits of three sensors.

FIG. 9 is a concrete practical example of a self-monitoring circuit.

Each accelerometer comprises its own circuit. Here, any three sensors are shown, but in practice the sensors which must be monitored very closely are the accelerometers, this being for two basic reasons: on the one hand they are fragile, and on the other hand operation of a single one of them is capable of triggering the operation of recording by changing the device from the monitoring state to the state of acquisition. It is therefore important to make sure, every time this operation is triggered, that it is in fact a reaction to an actual phenomenon and not an anomaly.

The other sensors not only are more robust, but are interrogated by the device and hence are not capable of starting recording. They measure, in fact, parameters which evolve slowly and which may even be permanent (humidity, for example, is permanent and the important thing is not the existence or non-existence of humidity, but knowing the degree, variations or abnormal values thereof). It should be noted that the more frequent is interrogation of the sensors by the device, the greater is the expenditure of energy and the more autonomy is reduced.

In some cases, the sensors of slow phenomena can be interrogated only at the time when an accelerometer starts recording (state of acquisition) when the essential critical situation is the concomitance of a shock and a temperature or a pressure, for example.

For the present description, it will therefore be considered that three accelerometers are involved here.

Each of these has a separate and fully autonomous power supply 2210, 2211 and 2212 which may be a battery, for example. Each power supply is associated with a stabilizer 2213, 2214 and 2215 with two outputs, one being connected directly by a line 2216, 2217 and 2218 to one input of a comparator 2219, 2220 and 2221 and the other to a measuring bridge 2222, 2223 and 2224 the output of which is connected by a line 2225, 2226 and 2227 to the second input of the comparator 2219, 2220 and 2221, a transverse line 2228 connecting the three lines 2225, 2226 and 2227.

The outputs of the three comparators 2219, 2220 and 2221 are connected to a single line 2229 ending in a port of the microprocessor.

Operation of this circuit is as follows:

Each power supply and each of the resistances of the circuit are calculated in such a way that a low current passes on the one hand through the lines 2216, 2217 and 228 and on the other hand through the lines 2225, 2226 and 2227, for example 0.5 milliamperes for a voltage of 2.5 volts.

The comparators 2219, 2220 and 2221 therefore each receive two currents of the same value and the same voltage if no incident arises. The difference measured by each comparator is therefore zero, which means that everything is normal.

If an incident arises, the system is unbalanced:

total absence of current due to a failure of the source 2210-2211-2212 or failure of the stabilizer 2213-2214-2215. Then, the corresponding comparator detects a difference because its input connected to the line 2216-2217-2218 does not receive any current at all, but its other input still receives a current owing to the transverse line 2228 which supplies it from the other sources. Without this line, the total absence of current at the two inputs of the comparator would still give a difference of zero, signifying that the circuit is in working order;

partial absence of current due to failure of a resistance of a measuring bridge, for example. The direct line 2216-2217-2218 gives the corresponding comparator an unchanged current, while the current of the other line 2225-2226-2227 is for its part affected. The comparator 2219-2220-2221 therefore detects a difference.

When no comparator detects a difference, it transmits a "0" signal on the line 2229, the microprocessor thus receiving a message that it is working properly, which in particular accredits the data provided by the sensors.

When a comparator detects a difference, it transmits a "1" signal on the line 2229, the microprocessor thus receiving a breakdown message which can be utilized in different ways.

Figure 10:
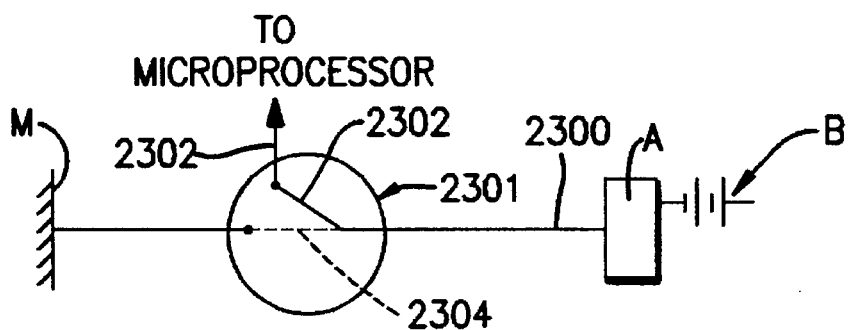
FIG. 10 is a diagram showing one possibility of starting operation of an apparatus with minimum energy expenditure.

FIG. 10 shows how control can be brought about without using much energy.

The condition is that the breakdown of a sensor or the recording of a critical datum (exceeding a certain threshold value, for example) must be used to control an apparatus A which may be a powerful pilot lamp, a sound alarm, a generating set, a refrigerator compressor, etc.

For operation thereof, it is connected to a supply B of any desired power, since it is completely external to the monitoring device according to the invention. The apparatus A is also connected to earth M by a line 2300, because the apparatus A can work only if there is continuity of the line 2300 to earth M.

On the line 2300 is placed a transistor 2301 which works as a gate, according as it is or is not supplied by a line 2302 from the microprocessor.

During normal running, that is, if no serious incident is detected, no current travels along the line 2302 and therefore the transistor 2301 is not supplied. In this case, it interrupts the line 2300, which has been symbolized by an unbroken line 2303, the apparatus A then being prevented from working.

As soon as an incident arises and it is significant enough to justify starting the apparatus A, the microprocessor transmits a signal on the line 2302 to drive the transistor 2301 which "flips" and closes the contact to ensure electrical continuity along the whole line 2300, which has been symbolized by a broken line 2304. The apparatus A can then work normally by means of its own power source B and according to a program which becomes independent of monitoring.

What is claimed is:

1. A method of monitoring an item of equipment by a user, of the type in which stresses undergone by said items of equipment are sensed and signals corresponding to said stresses are recorded by a monitoring device, and said signals are then read out of said monitoring device, the method comprising the steps of:

storing in a memory, rules pertaining to a monitoring job;

providing at least one sensor to sense said stresses while said monitoring device is in a monitoring state and while said monitoring device is in an acquisition state;

placing said monitoring device in said monitoring state wherein electrical power is cut off substantially from said memory and from a recorder;

storing a date and a time at which said monitoring job is started when said monitoring device is first placed in said monitoring state;

providing threshold detector means, operable in said monitoring state and connected to a threshold voltage level, for determining if said signal from said at least one sensor exceeds a predetermined threshold level;

changing over said monitoring device from said monitoring state to said acquisition state wherein electrical power is supplied to said recorder, when said signal from said at least one sensor exceeds said predetermined threshold level; and sensing sensor signals representing said stresses and recording in real time at least some of said sensor signals as stress data in accordance with said rules pertaining to said monitoring job;

prohibiting unauthorized access to said rules stored in said memory;

prohibiting unauthorized access to said stresses data recorded according to said rules; and changing over said monitoring device from said monitoring state to said acquisition state when recording any event which may have an effect of neutralizing said at least one sensor.

2. A method as claimed in claim 1, wherein:

said step of providing at least one sensor includes a step of providing a plurality of said sensors; and said step of sensing sensor signals is performed by recording only a portion of a plurality of sensor signals from said respective plurality of sensors.

3. A method as claimed in claim 1, wherein said step of changing over said monitoring device from said monitoring state to said acquisition state is performed when recording any event which may have an effect of activating said at least one sensor.

4. A method as claimed in claim 1, further comprising the steps of checking upon request and before any recording operation, a proper functionality of said at least one sensor.

5. A method as claimed in claim 1, further comprising the step of calculating a duration of said stresses.

6. A device for monitoring items of equipment by a user, comprising:

a recorder assembly;

at least one sensor connected to said recorder assembly;

a microprocessor connected to a data bus;

a plurality of memories connected to said data bus;

time stamp means connected to said data bus;

means for programming said microprocessor;

means for reading out data from said plurality of memories;

said plurality of memories comprising:

i) a first memory for storage of a program for data acquisition and programming;

ii) a second memory for storage of rules and specific data constituting a specific monitoring job, said second memory being in a state of permanent backup as soon as said rules and specific data are effectively stored therein, and said second memory being protected against unauthorized access; and iii) a third memory for storage of data representing a signal from said at least one sensor;

means for selective access to said first memory, said second memory and said third memory and being associated with blocking means for blocking unauthorized access to said first memory, said second memory, and said third memory and capable of being released only by authorized users;

said recorder assembly, said microprocessor, said plurality of memories, said means for programming said microprocessor, said means for reading out data, and said means for selective access having main electrical power removed when said device is in a monitoring state;

said recorder assembly, said microprocessor, and said plurality of memories having main electrical power applied when said device is in an acquisition state;

threshold detector means, operable in said monitoring state and connected to a threshold voltage level, for determining if said signal from said at least one sensor exceeds a predetermined threshold level;

means for changing over said device from said monitoring state to said acquisition state when said recorder records any event which may have an effect of neutralizing said at least one sensor.

7. A device as claimed in claim 6, further comprising:

a plurality of said sensors connected to said recorder assembly and provided with means for checking functionality of said plurality of sensors and for causing data indicative of said functionality of said plurality of sensors to be stored in said third memory.

8. A device as claimed in claim 6, further comprising means for backing up electrical power to said first memory, said second memory, and said time stamp means.

9. A device as claimed in claim 6, wherein said device further comprises:

means, connected to said microprocessor, for placing said at least one sensor in a suspended state wherein electrical power to said at least one sensor is removed substantially to conserve energy of a power supply of said device;

said device being in said monitoring state when said first memory effectively contains said program and said second memory effectively contains said rules and specific data.

10. A device as claimed in claim 6, wherein said device is in said acquisition state when any of a plurality of said sensors receives a signal having a value exceeding a predetermined threshold value stored in said second memory.

11. A device as claimed in claim 6 including three of said sensors, said three sensors including:

three accelerometers mounted in a trihedron for providing accelerometer signals, said accelerometer signals being filtered by three sets of three different bandpass filters mounted in parallel for supplying filtered signals to three inlets of said microprocessor; and means for adding said filtered signals from identical filters of each of said three sets, before said filtered signals are supplied to said inlets of said microprocessor.

12. A device as claimed in claim 6 including at least six of said sensors, said at least six sensors comprising three accelerometers and three sensors selected from a group consisting of temperature sensors, pressure sensors, and humidity sensors, all of said at least six sensors being connected to respective inlets of said microprocessor.

13. A device as claimed in claim 6, further comprising at least one pilot lamp which is illuminated when a value of said signal from said at least one sensor exceeds a predetermined threshold value, and when control means for manually illuminating said pilot lamp is operated.

* * * * *